C. W. GLOVER.

Harvester Cutter.

No. 3,163. Reissued Oct. 20, 1868.

N. PETERS, Photo-Lithographer, Washington, D. C.

United States Patent Office.

JOHN G. PERRY, OF KINGSTON, RHODE ISLAND, ASSIGNEE, BY MESNE ASSIGNMENTS, OF CARLOS W. GLOVER, OF ROXBURY, CONNECTICUT.

*Letters Patent No.* 15,334, *dated July* 15, 1856; *reissue No.* 3,163, *dated October* 20, 1868.

IMPROVEMENT IN HARVESTER-CUTTERS.

The Schedule referred to in these Letters Patent and making part of the same.

*To all whom it may concern:*

Be it known that CARLOS W. GLOVER, of Roxbury, in the county of Litchfield, and State of Connecticut, invented a new and useful Improvement in the Sickles or Cutting-Devices of Harvesting-Machines, on which Letters Patent were granted, bearing date the 15th day of July, 1856; that the said Letters Patent have been assigned to me, JOHN G. PERRY, of Kingston, in the county of Washington, and State of Rhode Island; and that the following is a full, clear, and exact description of such invention, reference being had to the accompanying drawings, making a portion of this specification, in which—

Similar letters of reference indicate corresponding parts in all the figures.

This invention consists in the arrangement of ledger-blades or supplemental cutters, recessed at their upper sides, in such relation with the guard-fingers and the vibrating sickle of a harvester, as to provide, by their oscillating motion, against the liability of clogging the sickle, when the machine is in operation.

The invention further consists in so fitting the recessed cutters to the guard-fingers that they may have a rocking or oscillating movement during the vibratory movement of the sickle, whereby the knives of the latter are enabled to act with increased efficiency in cutting the grain or grass.

The invention further consists in a novel means of attaching the ledger-blades to the guard-fingers, whereby the same are permitted to rock, and are effectually prevented from being accidentally detached.

To enable others to understand the construction and operation of my invention, I will proceed to describe it, with reference to the drawings.

A represents a finger-bar, furnished with guard-fingers B; and shown at C is the sickle-bar, provided with knives or cutters, *a*, of the usual triangular shape.

Figure 2:
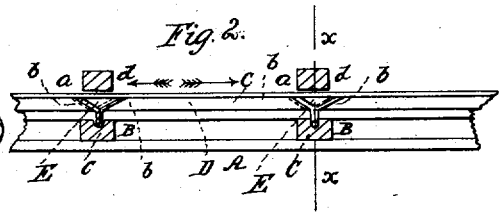
Figure 2 is a longitudinal section of the same, taken in the line *y y* of fig. 1.
Figure 3:
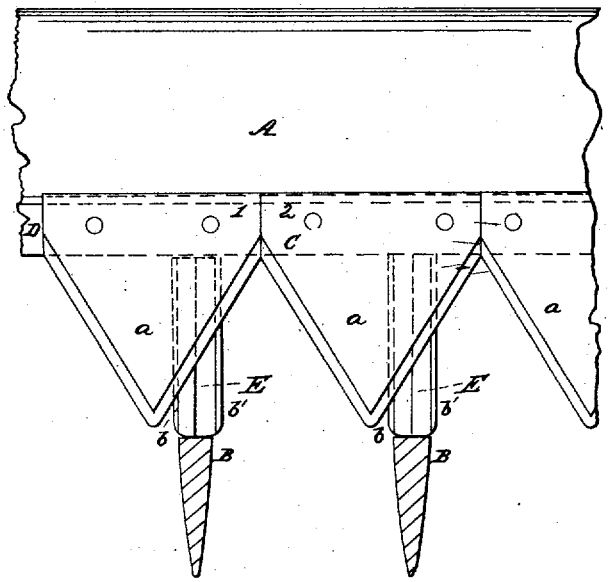
Figure 3 is a horizontal section of the same, taken in the line *z z* of fig. 1.

Fitted within each of the guard-fingers is a ledger-blade or cutter, E, which may be V-shaped in its cross-section, as shown in fig. 2, and which is hollowed out at its upper side, so that a cavity or recess is formed therein, the purpose of which will presently herein appear, and has the two lateral cutting-edges *b b'* at its upper part, and which may be made of steel plate, bent or shaped to the requisite form.

The cutters E are fitted in grooves or recesses formed longitudinally in the upper surfaces of those portions of the guard-fingers below the ordinary horizontal slots thereof, a sufficient space being left between the edges *b b'* of the cutters and the top parts *d* of the guard-fingers, to permit the knives *a* of the sickle to pass through such spaces.

Figure 1:
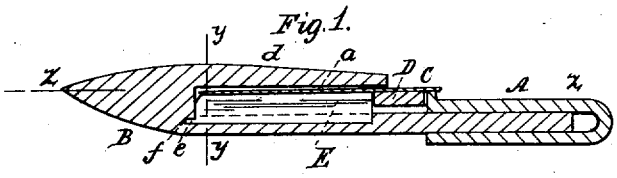
Figure 1 is a transverse section of this improvement, taken in the line *x x* of fig. 2.

Each of the ledger-blades or cutters has, at the lower part of its forward end, a forwardly-extending projection, *e*, which fits into a cavity, *f*, formed in the adjacent portion of the guard-finger, in which such cutter is placed, as indicated in fig. 1, to hold it in place, and the groove in which the cutter is placed being of sufficient width, when the sickle vibrates over the cutters, as in the operation of the machine, the cutting-edges *b b'* of the latter will bear alternately against the lower surfaces of the knives *a* of the sickle. Thus, for instance, when the sickle moves in the direction indicated by the black arrow in fig. 1, the cutting-edge *b* of the cutters E will bear upward, so that one edge of the knives *a* will move snugly in contact therewith, and when the sickle is moved in an opposite direction, as indicated by the red arrow, the cutting-edge *b'* of the cutters will bear upward, so that the other edges of the knives just mentioned may move close thereto, the efficient operation of the knives of the sickle, in cutting the grain or grass, being by this means very materially increased. Furthermore, the upper sides of the ledger-blades or cutters E, being recessed longitudinally, as hereinbefore set forth, the clogging or wedging of grass, dirt, or other material between such cutters and the knives of the sickle is effectually provided against.

What I claim as the invention of CARLOS W. GLOVER, and desire to secure by Letters Patent, is—

1. The combination, with the guard-fingers, of the oscillating or rocking ledger-blades or cutters, constructed with recesses in their upper sides, substantially as and for the purpose specified.

2. So arranging the ledger-blades or cutters, constructed as described, within the guard-fingers, that they may have a rocking or oscillating movement during the reciprocating movement of the sickle, substantially as herein set forth.

3. The attachment of the ledger-blades to the guard-fingers, by means of the trunnions *e* on the blades extending into the cavities *f* in the fingers, substantially as and for the purpose specified.

JOHN G. PERRY.

Witnesses:
A. LE CLERC,
EDWD. P. TRACY.